(12) United States Patent
Yoshizumi et al.

(10) Patent No.: US 8,564,800 B2
(45) Date of Patent: Oct. 22, 2013

(54) PRINTING SYSTEM, PRINTING APPARATUS, COMPUTER PROGRAM, AND STORAGE MEDIUM

(75) Inventors: Takeshi Yoshizumi, Tokyo (JP); Masaaki Igarashi, Saitama (JP); Takahiro Hirakawa, Kanagawa (JP); Hozumi Yonezawa, Tokyo (JP); Hiroshi Gotoh, Tokyo (JP); Kohji Yamamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 433 days.

(21) Appl. No.: 12/851,837

(22) Filed: Aug. 6, 2010

(65) Prior Publication Data

US 2011/0058215 A1    Mar. 10, 2011

(30) Foreign Application Priority Data

Sep. 10, 2009    (JP) ................. 2009-209809

(51) Int. Cl.
*G06F 3/12*    (2006.01)
(52) U.S. Cl.
USPC ......... 358/1.14; 358/1.15; 358/1.1; 714/47.1; 714/48; 714/47.2; 714/47.3
(58) Field of Classification Search
USPC .......... 358/1.1, 1.15, 1.14; 714/47.1–47.3, 48
See application file for complete search history.

(56) References Cited

U.S. PATENT DOCUMENTS

| | | | | |
|---|---|---|---|---|
| 5,471,564 A | * | 11/1995 | Dennis et al. ................. | 358/1.15 |
| 6,856,416 B1 | * | 2/2005 | Danknick .................... | 358/1.15 |
| 7,027,169 B1 | | 4/2006 | Morikawa et al. | |
| 2003/0090697 A1 | * | 5/2003 | Lester et al. ................. | 358/1.14 |
| 2005/0088681 A1 | * | 4/2005 | Hosoda ........................ | 358/1.14 |
| 2005/0141013 A1 | * | 6/2005 | Kikuchi et al. .............. | 358/1.14 |
| 2005/0237571 A1 | | 10/2005 | Motamed et al. | |
| 2006/0244991 A1 | | 11/2006 | Tenger et al. | |
| 2011/0075192 A1 | * | 3/2011 | Kumamoto .................. | 358/1.15 |

FOREIGN PATENT DOCUMENTS

| | | | |
|---|---|---|---|
| CN | 1167684 A | | 12/1997 |
| CN | 1624646 A | | 6/2005 |
| CN | 1869881 A | | 11/2006 |
| JP | 2002-189581 | | 7/2002 |
| JP | 2003196047 A | * | 7/2003 |
| JP | 2004-255674 | | 9/2004 |
| JP | 2007-272832 | | 10/2007 |
| JP | 2007-272833 | | 10/2007 |

(Continued)

OTHER PUBLICATIONS

Extended European Search Report issued Jan. 14, 2013 in Patent Application No. 10173066.1.

(Continued)

*Primary Examiner* — King Poon
*Assistant Examiner* — Lawrence Wills
(74) *Attorney, Agent, or Firm* — Oblon, Spivak, McClelland, Maier & Neustadt, L.L.P.

(57) ABSTRACT

A time limit for a printer to be restored to a printable state after an occurrence of a print error that prevents the printer from printing is variably set. If the printer is not in a printable state when an elapsed time since the print error occurred in the printer reaches the time limit being set or exceeds the time limit, a print start command is transmitted to another printer, and a job assignment is switched to the other printer.

9 Claims, 12 Drawing Sheets

20

| ERROR GROUP | WAITING TIME | ERROR | WAITING TIME | ERROR GROUP | | |
|---|---|---|---|---|---|---|
| | | | | GROUP 1 | GROUP 2 | GROUP 3 |
| GROUP 1 | 0 | ERROR 1 | 1 | 1 | 0 | 0 |
| GROUP 2 | 5 | ERROR 2 | 2 | 1 | 0 | 0 |
| GROUP 3 | 10 | ERROR 3 | 3 | 1 | 0 | 0 |
| | | ERROR 4 | 4 | 1 | 0 | 0 |
| | | ERROR 5 | 5 | 1 | 0 | 0 |
| | | ERROR 6 | 6 | 0 | 1 | 0 |
| | | ERROR 7 | 7 | 0 | 1 | 0 |
| | | ERROR 8 | 8 | 0 | 1 | 0 |
| | | ERROR 9 | 9 | 0 | 1 | 0 |
| | | ERROR 10 | 10 | 0 | 1 | 0 |
| | | ERROR 11 | 11 | 0 | 0 | 1 |
| | | ERROR 12 | 12 | 0 | 0 | 1 |
| | | ERROR 13 | 13 | 0 | 0 | 1 |
| | | ERROR 14 | 14 | 0 | 0 | 1 |
| | | ERROR 15 | 15 | 0 | 0 | 1 |

(56) References Cited

FOREIGN PATENT DOCUMENTS

| JP | 2009-69948 | 4/2009 |
|----|------------|--------|
| JP | 2009-214321 | 9/2009 |
| JP | 2009-217467 | 9/2009 |
| JP | 2009-297994 | 12/2009 |
| JP | 2009-301135 | 12/2009 |

OTHER PUBLICATIONS

Chinese Official Action mailed Mar. 6, 2013, in Application No. 201010503886.3, w/English translation, pp. 1-16.

* cited by examiner

FIG. 9

| PRINTER TO BE SET (IP ADDRESS) | TYPE | | CONSUMABLE STATUS | | ERROR CLASSIFICATION METHOD | | TIME PERIOD | |
|---|---|---|---|---|---|---|---|---|
| xxx.xxx.xxx.xxx | LP | 1 | NORMAL | 1 | FOR EACH ERROR | 1 | TIME PERIOD 1 | 1 |
| xxx.xxx.xxx.xxx | MFP | 0 | NEAR END | 0 | FOR EACH ERROR GROUP | 0 | TIME PERIOD 2 | 0 |
| xxx.xxx.xxx.xxx | | | | | | | | |
| xxx.xxx.xxx.xxx | | | | | | | | |
| | | | | | | | | |

FIG. 10

| ERROR GROUP | WAITING TIME | ERROR | WAITING TIME | ERROR GROUP | | |
|---|---|---|---|---|---|---|
| | | | | GROUP 1 | GROUP 2 | GROUP 3 |
| GROUP 1 | 0 | ERROR 1 | 1 | 1 | 0 | 0 |
| GROUP 2 | 5 | ERROR 2 | 2 | 1 | 0 | 0 |
| GROUP 3 | 10 | ERROR 3 | 3 | 1 | 0 | 0 |
| | | ERROR 4 | 4 | 1 | 0 | 0 |
| | | ERROR 5 | 5 | 1 | 0 | 0 |
| | | ERROR 6 | 6 | 0 | 1 | 0 |
| | | ERROR 7 | 7 | 0 | 1 | 0 |
| | | ERROR 8 | 8 | 0 | 1 | 0 |
| | | ERROR 9 | 9 | 0 | 1 | 0 |
| | | ERROR 10 | 10 | 0 | 1 | 0 |
| | | ERROR 11 | 11 | 0 | 0 | 1 |
| | | ERROR 12 | 12 | 0 | 0 | 1 |
| | | ERROR 13 | 13 | 0 | 0 | 1 |
| | | ERROR 14 | 14 | 0 | 0 | 1 |
| | | ERROR 15 | 15 | 0 | 0 | 1 |

FIG. 11

| TIME PERIOD | STARTING TIME | FINISHING TIME |
|---|---|---|
| TIME PERIOD 1 | 8:25 | 17:00 |
| TIME PERIOD 2 | 17:00 | 8:25 |
| | | |

PRINTING SYSTEM, PRINTING APPARATUS, COMPUTER PROGRAM, AND STORAGE MEDIUM

CROSS-REFERENCE TO RELATED APPLICATIONS

The present application claims priority to and incorporates by reference the entire contents of Japanese Patent Application No. 2009-209809 filed in Japan on Sep. 10, 2009.

BACKGROUND OF THE INVENTION

1. Field of the Invention

The present invention relates to a printing system, a printing apparatus, a computer program, and a storage medium.

2. Description of the Related Art

In printing systems in which a plurality of printing apparatuses is connected to a host apparatus through an electric communication line, a system is known that switches the execution of print processing to another printing apparatus when a print error that makes a printing apparatus that is currently executing a print processing impossible to continue printing occurs (Japanese Patent Application Laid-open No. 2002-189581).

In the technique disclosed in Japanese Patent Application Laid-open No. 2002-189581, the execution of printing is switched to another printing apparatus when a print error occurs. However, with a print error that may be corrected within a short period of time, the print processing performed by the original printing apparatus might have been faster or might have been more convenient for a user than that switched to be performed by another printing apparatus.

SUMMARY OF THE INVENTION

It is an object of the present invention to at least partially solve the problems in the conventional technology.

According to an aspect of the present invention printing system in which a host apparatus and a plurality of printing apparatuses are connected through an electric communication line, and any one of the printing apparatuses carries out a print processing corresponding to a print job including print data and a processing command transmitted from the host apparatus based on a job assignment to execute the print processing, the printing system comprises: a time limit setting unit that variably sets a time limit for the printing apparatus to be restored to a printable state after an occurrence of a print error that prevents the printing apparatus from printing; and a switching processing unit that switches the job assignment from the printing apparatus to another printing apparatus when the printing apparatus is not in a printable state when an elapsed time since the print error occurred in the printing apparatus reaches the time limit being set or exceeds the time limit.

According to another aspect of the present invention a printing apparatus used in the printing system according to the present invention comprises: the time limit setting unit; and the switching processing unit.

According to still another aspect of the present invention a computer readable storage medium stores therein the computer program that causes a computer to function as the time limit setting unit and the switching processing unit included in the printing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic of an example of property data;

FIG. 10 is a schematic of an example of time limit data;

FIG. 11 is a schematic of an example setting of a time limit based on time periods;

DETAILED DESCRIPTION OF THE PREFERRED EMBODIMENTS

Exemplary embodiments of the present invention will be described below in detail with reference to the accompanying drawings.

Configuration of Printing System

Figure 1:
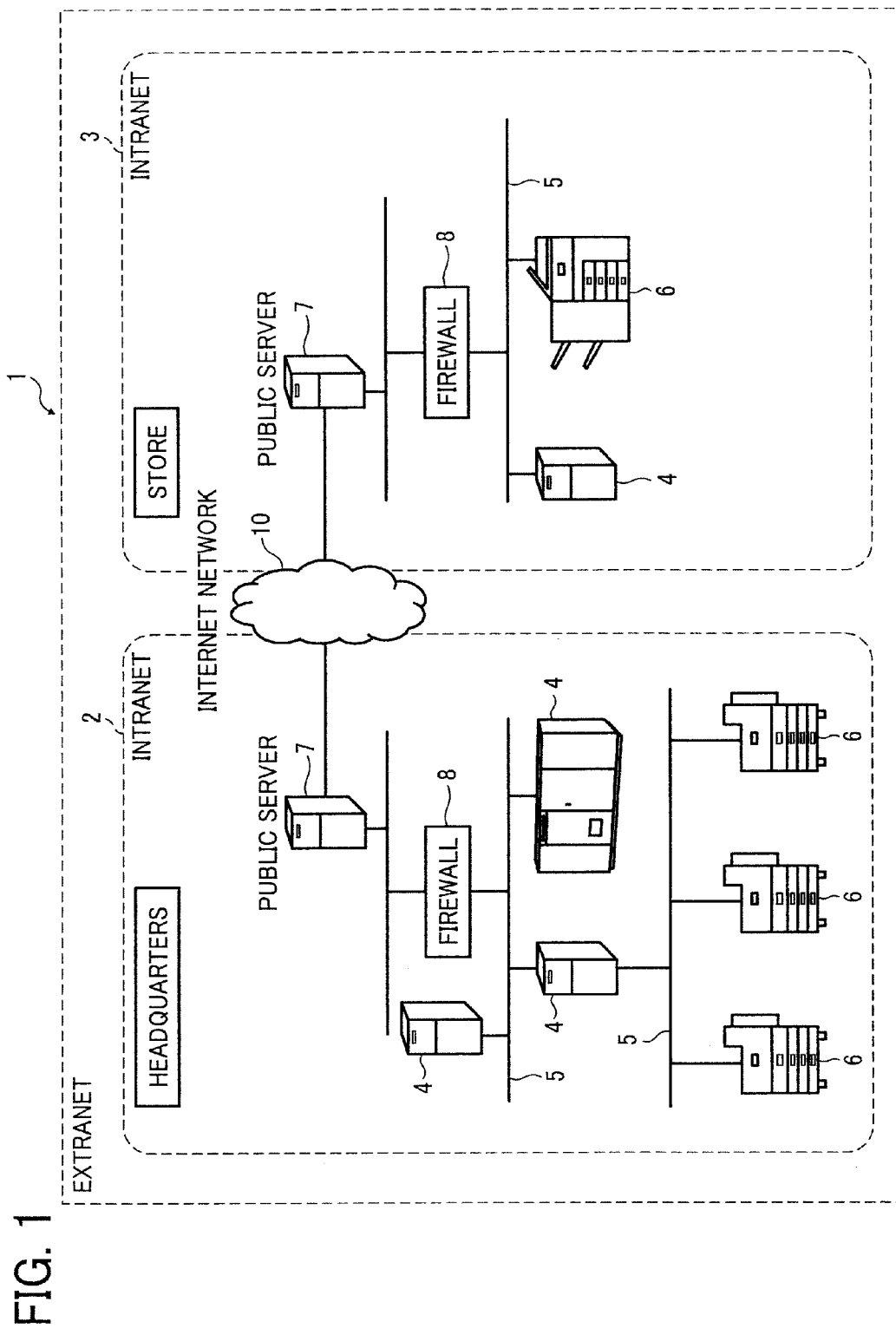
FIG. 1 is a schematic diagram of an overall configuration of a printing system according to an embodiment of the present invention.

As illustrated in FIG. 1, a printing system 1 according to the present embodiment is an extranet in which intranets 2 and 3 of a plurality of companies and business institutions, in other words, the intranets 2 and 3 that are internal corporate networks based on internet technology are connected to each other through an Internet network 10 serving as an electric communication line.

For example, the intranet 2 of the headquarters of a convenience store is a server-client system in which a plurality of clients 6 such as computers and printers is connected to various server computers 4 (hereinafter, "servers") through a network 5 such as Local Area Network (LAN) serving as an electric communication line. In such an intranet 2, a firewall 8 is provided at a boundary of the corporate network 5 excluding the boundary between the Internet network 10 and a public server 7 such as a World Wide Web (WWW) server. The firewall 8 monitors inbound and outbound packets between the corporate network 5 and the Internet network 10, and ensures the security of the corporate network 5 by allowing or denying (discarding) the packets to pass through based on a predetermined set of rules.

For example, the intranet 3 of a franchise store is also a server-client system in which the clients 6 such as computers and printers are connected to various servers 4 through the network 5 such as LAN. In such an intranet 3, the firewall 8 is provided at the boundary of the corporate network 5 excluding the boundary between the Internet network 10 and the public server 7.

The intranets 2 and 3 may also be connected through an exclusive communication line instead of the Internet network 10. At least a part of the network 5 may be configured by a wireless communication system (such as infrared light or radio waves). The network 5 may also be configured by optical fibers.

Figure 2:
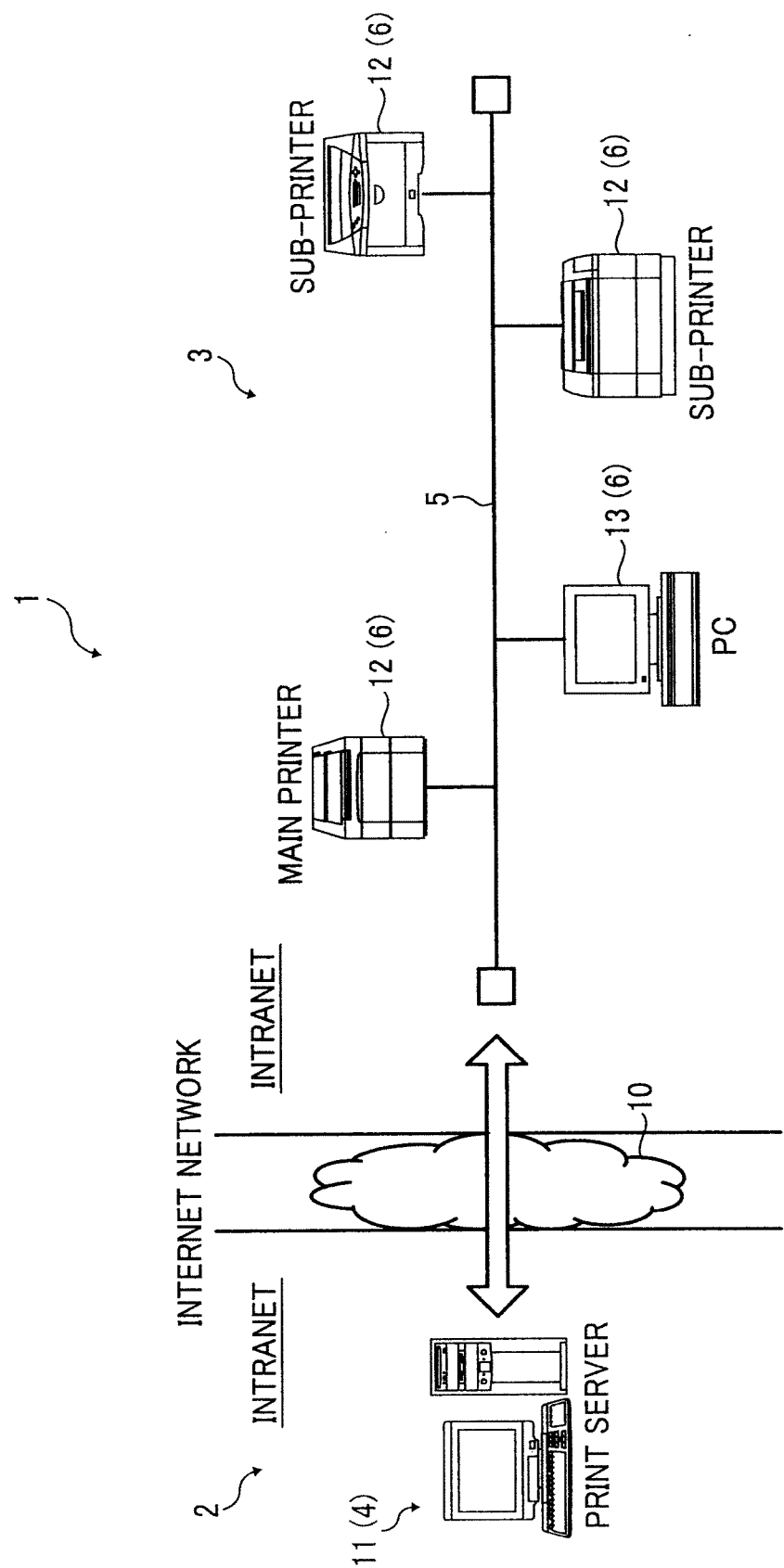
FIG. 2 is a schematic diagram of an example of a part of the printing system.

As illustrated in FIG. 2, in the printing system 1 described above, for example, a print server 11 serves as a host apparatus that is one of the servers 4 included in the intranet 2 of the headquarters of the convenience store. The print server 11 may directly instruct a printer 12 to print sales promotion materials and the like, wherein the print server 11 serves as a printing apparatus that is one of the clients 6 included in the intranet 3 of the franchise store. As illustrated in FIG. 2, the intranet 3 includes a plurality of printers 12 having the same functions and a personal computer (PC) 13. In the intranet 3, three printers 12 are connected, namely the main printer 12 located at the top, and the sub-printers 12 located below are connected through the network 5.

Configuration of Print Server

Figure 3:
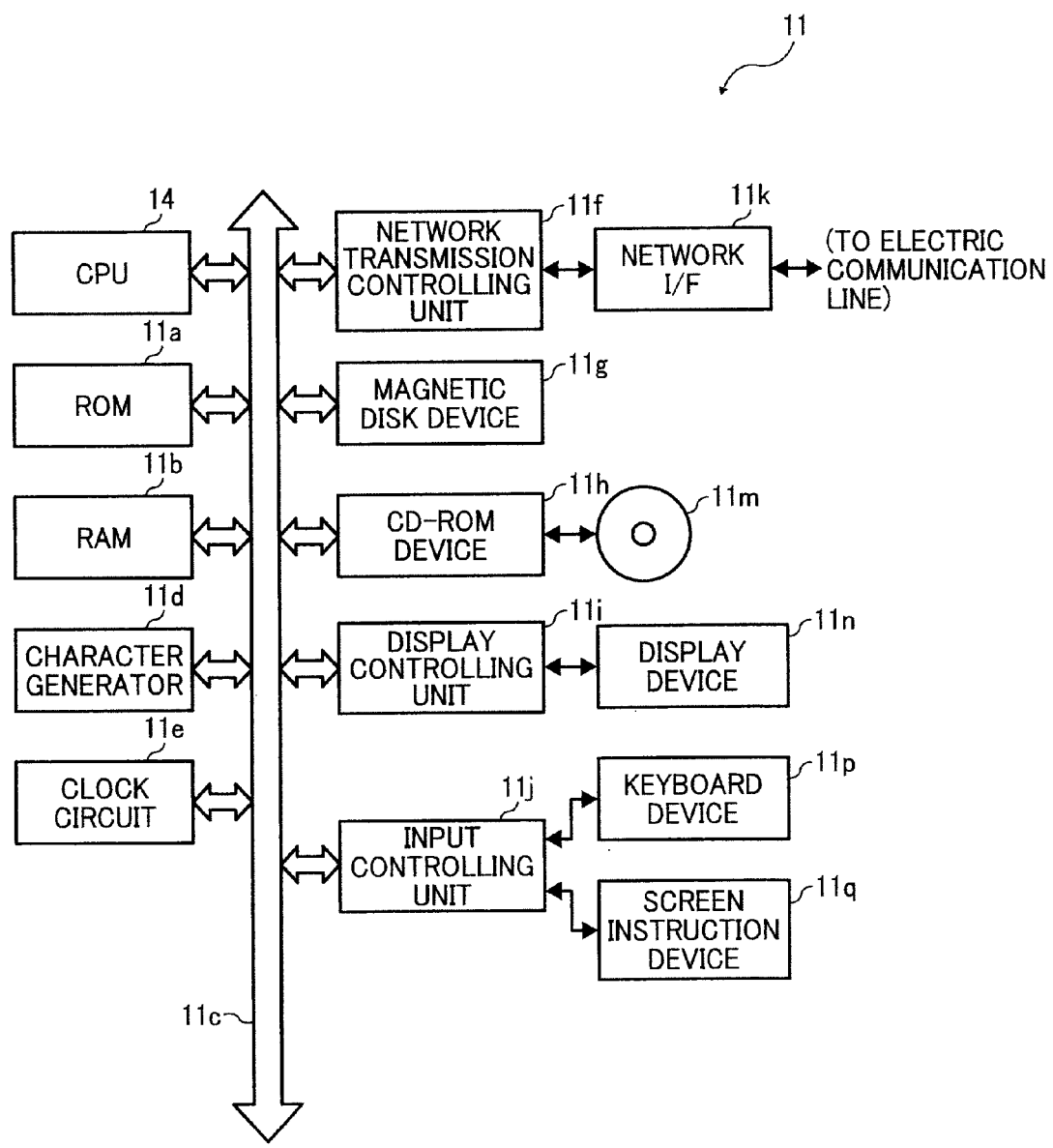
FIG. 3 is a block diagram of an example of a print server.

As illustrated in FIG. 3, the print server 11 includes a central processing unit (CPU) 14 that controls the operation performed by the print server 11. A read only memory (ROM) 11*a* and a random access memory (RAM) 11*b* are connected to the CPU 14 through an internal bus 11*c*. The read only memory (ROM) 11*a* stores therein programs executed by the CPU 14 at startup, required data, and the like. The random access memory (RAM) 11*b* constitutes a work area and the like of the CPU 14.

A character generator 11*d*, a clock circuit 11*e*, a network transmission controlling unit 11*f*, a magnetic disk device 11*g*, a compact disk-read only memory (CD-ROM) device 11*h*, a display controlling unit 11*i*, and an input controlling unit 11*j* are also connected to the CPU 14 through the internal bus 11*c*. Data exchange among these elements is mainly performed through the internal bus 11*c*.

The character generator 11*d* generates display data of graphic characters. The clock circuit 11*e* outputs current date and time information.

The network transmission controlling unit 11*f* executes a communication control process of various predetermined protocol suites to exchange various kinds of data with the other servers 4 and the clients 6 through a network interface (I/F) 11*k* and the network 5. The network interface 11*k* is connected to the printer 12, which is one of the clients 6 of the other intranet (here, intranet 3), through the network 5 and the Internet network 10. The network interface 11*k* transmits print data and the like to the printer 12 and receives printing status and the like from the printer 12.

The magnetic disk device 11*g* stores therein an operating system (OS), various application programs that run on the OS, and various types of data such as work data, file data, and image information data. In the present embodiment, a print data transmission program and the like are stored in the magnetic disk device 11*g* as an application program. The CD-ROM device 11*h* reads data (various application programs and various types of data such as work data, file data, and image information data) stored in a CD-ROM 11*m* that is an exchangeable recording medium.

In such a print server 11, when a user turns on the power, the CPU 14 starts up a loader (program) in the ROM 11*a*, reads the OS from the magnetic disk device 11*g* into the RAM 11*b*, and starts up the OS. When the OS is started up, the OS starts up application programs and reads and stores therein information, in response to the operation by the user. The recording medium is not limited to the CD-ROM 11*m*, but may be any other computer-readable recording media, such as a flexible disk (FD), a compact disk-recordable (CD-R), a compact disk-rewritable (CD-RW), a digital versatile disk (DVD), and a semiconductor memory. Needless to say, in such a case, the CD-ROM device 11*h* may be replaced with a device capable of reading data from a corresponding storage medium. The application program is not limited to a computer program that runs on a predetermined OS, but may be a computer program that causes the OS to execute a part of various types of processing, which will be described later. The application program may also be a computer program included in a part of a group of program files that forms predetermined application software, the OS, and the like.

In general, application programs installed in the magnetic disc device 11*g* of the print server 11 are stored in a storage medium such as the CD-ROM 11*m*, and the application programs stored in the storage medium are installed in the magnetic disk device 11*g*. Accordingly, a portable storage medium such as the CD-ROM 11*m* may also be a storage medium that stores therein application programs. The application programs may also be externally taken in, for example, through the network interface 11*k*, and installed in the magnetic disk device 11*g*.

The display controlling unit 11*i* controls a display device 11*n* such as a cathode ray tube (CRT), and displays characters and images corresponding to display data received from the CPU 14 on the display device 11*n*. The input controlling unit 11*j* takes in an input signal in response to the operation of keys of a keyboard device 11*p* or an input signal in response to the operation on a screen instruction device 11*q* using, for example, a mouse and a pointing device, and notifies the CPU 14 of the input signals.

An appropriate application program is started up by the print server 11, and print document information may be produced by the application program and stored in the magnetic disk device 11*g*. The print document information stored in the CD-ROM 11*m* may be read out by the CD-ROM device 11*h*, and taken into the print server 11. The print document information may be rebuilt from information received by e-mail and the like through the network 5 and the Internet network 10, and taken into the print server 11. Accordingly, the print document information is stored in the print server 11.

Configuration of Printer

Figure 4:
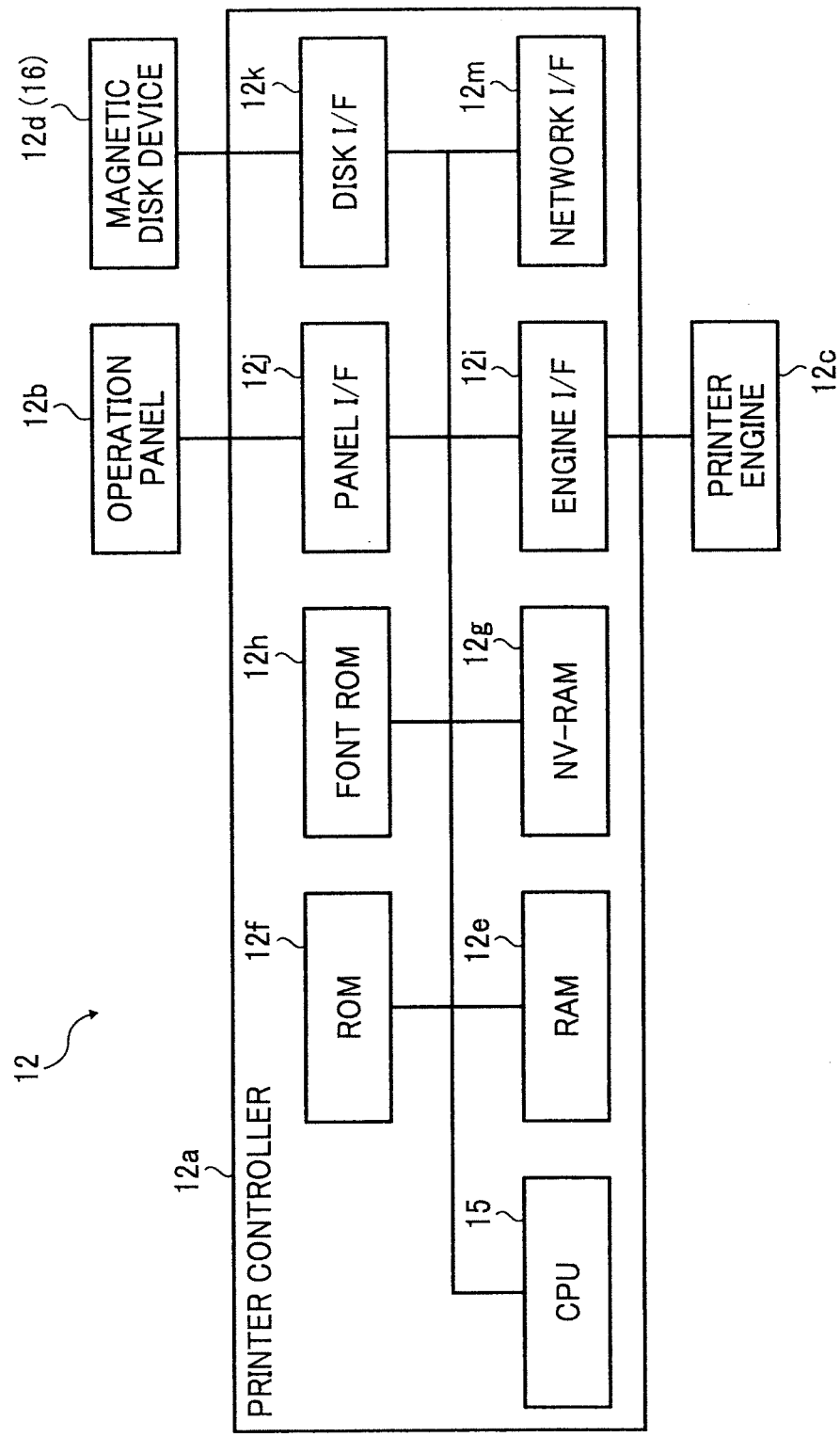
FIG. 4 is a block diagram of an example of a hardware configuration of a printing apparatus.

As illustrated in FIG. 4, the printer 12 includes a printer controller (motherboard) 12*a* that performs various types of control processing such as control processing of each of the units of the printer 12 and control processing of image forming. An operation panel 12*b*, a printer engine 12*c*, and a magnetic disk device 12*d* are connected to the printer controller 12*a*.

The printer controller 12*a* is a general term of a control mechanism that converts print data from the various servers 4 in the intranets 2 and 3 (such as the print server 11 in the intranet 2) to drawing data and outputs the data, which is converted, to the printer engine 12*c*. The printer controller 12*a* converts and outputs the above described data based on a control mode being set then and a control code received from the various servers 4 in the intranets 2 and 3 (such as the print server 11 in the intranet 2). The printer controller 12*a* includes a module as described below. In other words, the printer controller 12*a* includes a CPU 15 that acts as the main controller, a RAM 12*e*, a ROM 12*f* for storing therein various types of information inherent to the printer 12, a NV-RAM 12*g* that is a non-volatile memory capable of storing therein data regardless of the power is turned on or turned off, a Font ROM 12h that is a memory in which a several types of fonts used for printing are stored, an engine interface 12i, a panel interface (I/F) 12j for connecting with the operation panel 12b, a disk interface (I/F) 12k for connecting with the magnetic disk device 12d, a network interface (I/F) 12m, and the like.

The operation panel 12b is a switching unit capable of changing the status display, modes, and printing conditions of the printer 12.

The printer engine 12c forms an image by an electrophotographic process and records the image on a recording sheet as an output. More specifically, the printer engine 12c forms an image by creating an electrostatic image on a photosensitive body (not illustrated) and feeding a recording sheet from a sheet-feeding unit (not illustrated) based on drawing data and control information from the printer controller 12a.

The magnetic disk device 12d stores therein various types of print document information and stores therein an appropriate information file and the like other than the print document information. An operating system (OS) and various application programs that run on the OS are also stored in the magnetic disk device 12d. In the present embodiment, a printing process program and the like is stored therein as an application program.

The RAM 12e is used as a work area for the CPU 15, a buffer for receiving data from the various servers 4 in the intranets 2 and 3, and an image development area after the processing.

The engine interface (I/F) 12i is an interface that transmits and receives a control signal from the printer controller 12a to the printer engine 12c, a status signal from the printer engine 12c to the printer controller 12a, and the like.

The network interface 12m is an interface that transmits and receives a control signal from the various servers 4 (such as the print server 11) in the intranets 2 and 3 to the printer 12, data, a status signal from the printer 12, and the like, through the network 5.

The printer 12 having such a structure as described above, in a similar manner as the server 4 and the like, reads the OS from the magnetic disk device 12d into the RAM 12e and starts up the OS when a user turns on the power. When the OS is started up, the OS starts up application programs and reads and stores therein information in response to the operation performed by the user. The application program is not limited to a computer program that runs on a predetermined OS, but may be a computer program that causes the OS to execute a part of various types of processing, which will be described later. The application program may also be a computer program included in a part of a group of program files that forms a predetermined application program, the OS, and the like.

In general, the application programs installed in the magnetic disc device 12d of the printer 12 are stored in the storage medium such as a CD-ROM (not illustrated) and the application programs stored in the storage medium are installed in the magnetic disk device 12d. Accordingly, a portable storage medium such as the CD-ROM may also be a storage medium that stores therein application programs. The application programs may also be externally taken in, for example, through the network interface 12m, and installed in the magnetic disk device 12d.

In the present embodiment, the application programs, the OS, and the like are stored in the magnetic disk device 12d. The application programs, the OS, and the like may also be stored in a computer readable storage medium such as a semiconductor memory and the like, instead of the magnetic disk device 12d.

Figure 5:
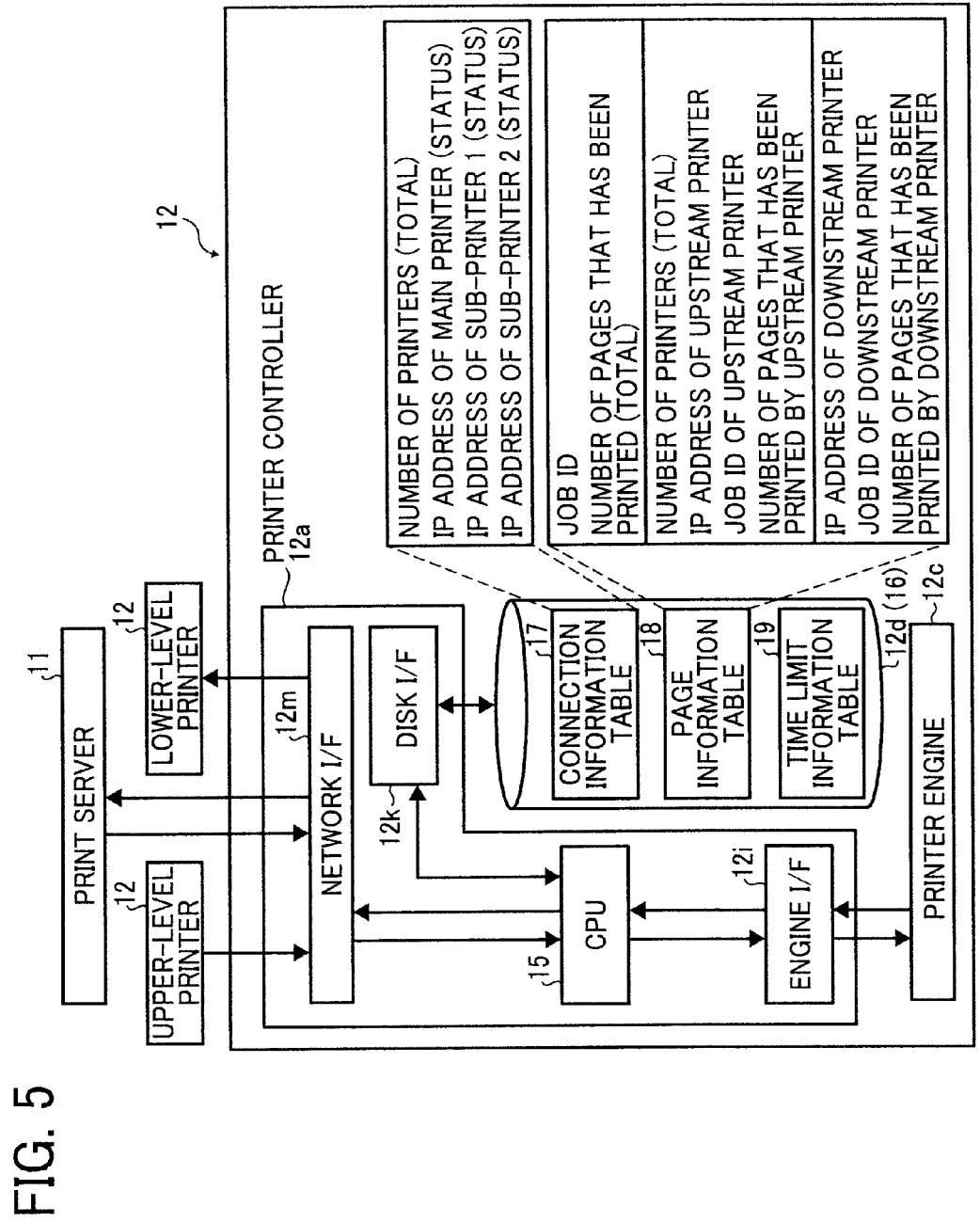
FIG. 5 is a block diagram of an example of the printing apparatus.

A connection information table 17, a page information table 18, a time limit information table 19, and the like are formed in the magnetic disk device 12d that serves as a storage unit 16, as illustrated in FIG. 5. The tables 17, 18, and 19 are used in a print processing and a substitute print processing in which the printer 12 executing the print processing is changed (switching operation of a job assignment). For example, the connection information table 17 stores therein information on the printer 12 required to execute the substitute print processing such as the number of printers 12 in a group that performs the substitute process and IP addresses of the printers 12 (main printer and sub-printers). The page information table 18 stores therein information related to the print processing in the substitute print processing such as a job ID, the number of pages that has been printed, the number of printers, and the IP addresses of the printers. The time limit information table 19 stores therein a time limit for the printer to be restored to a printable state after an occurrence of a print error that prevents the printer from printing (time limit to switch the printer 12), and the like. In the present embodiment, when the printer 12 is restored to a printable state within the time limit being set, the print processing is carried out by the printer 12. When the printer 12 is not restored even if the time limit has passed since the print error occurred, the print processing is carried out by another printer 12. At least a part of information stored in the tables may also be stored in the RAM 12e, the NV-RAM 12g, and the like.

Figure 6:
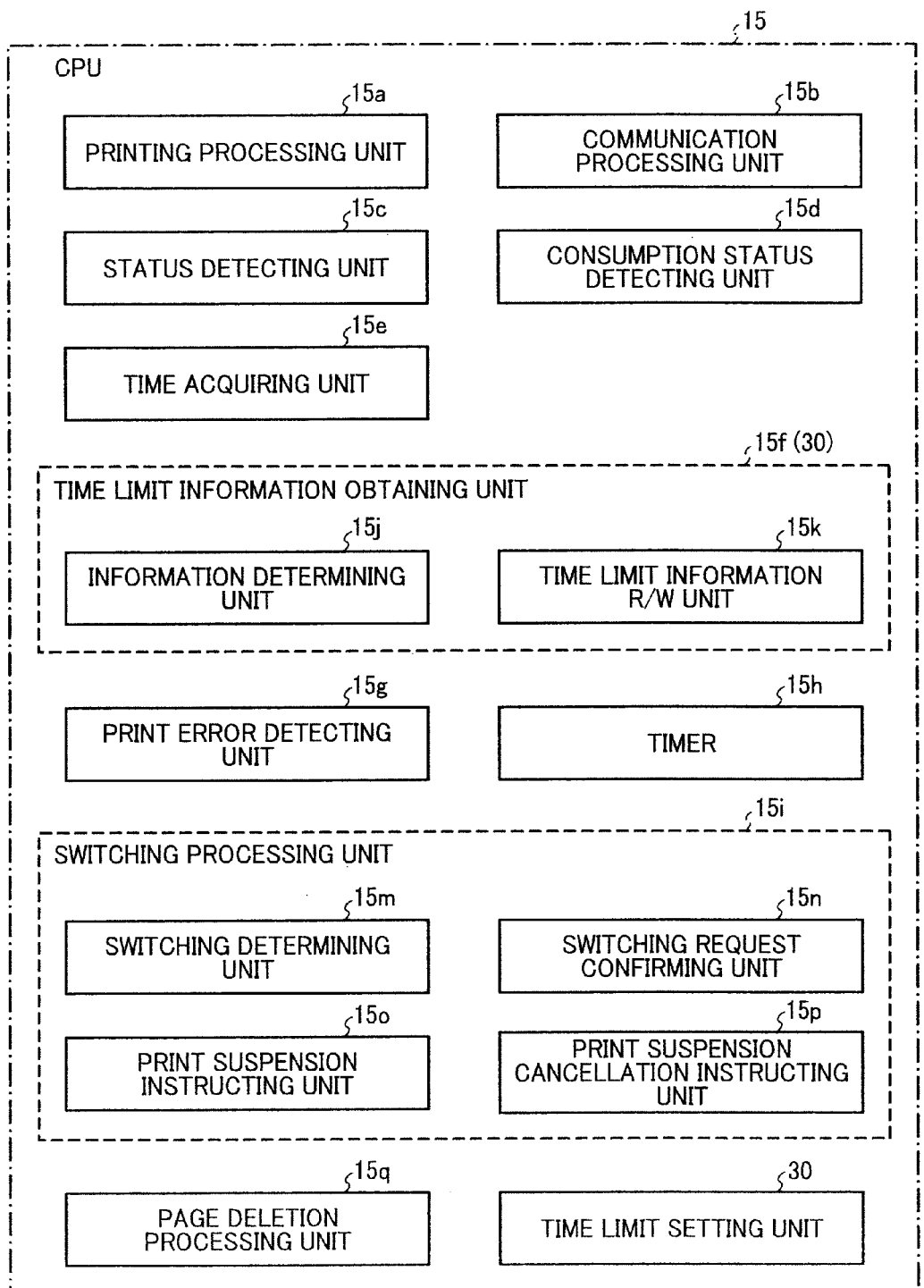
FIG. 6 is a block diagram of an example of a CPU of the printing apparatus.

In the present embodiment, by executing the application programs stored in the RAM 12e, as illustrated in FIG. 6, the CPU 15 acts as a print processing unit 15a, a communication processing unit 15b, a status detecting unit 15c, a consumption status detecting unit 15d, a time acquiring unit 15e, a time limit information obtaining unit 15f, a print error detecting unit 15g, a timer 15h, a switching processing unit 15i, a time limit setting unit 30, and a page deletion processing unit 15q. The time limit information obtaining unit 15f includes an information determining unit 15j and a time limit information read-write unit (R/W) 15k. The switching processing unit 15i includes a switching determining unit 15m, a switching request confirming unit 15n, a print suppression instructing unit 15o, and a print suppression cancellation instructing unit 15p. In other words, a computer program for the printer controller 12a includes modules for operating the CPU 15 as the print processing unit 15a, the communication processing unit 15b, the status detecting unit 15c, the consumption status detecting unit 15d, the time acquiring unit 15e, the time limit information obtaining unit 15f, the print error detecting unit 15g, the timer 15h, the switching processing unit 15i, the information determining unit 15j, the time limit information read-write unit 15k, the switching determining unit 15m, the switching request confirming unit 15n, the print suppression instructing unit 15o, the print suppression cancellation instructing unit 15p, the page deletion processing unit 15q, and the time limit setting unit 30.

The print processing unit 15a executes a print processing by controlling the printer engine 12c based on a print job including print data and a processing request.

The communication processing unit 15b manages communication of data and the like among the units of the CPU 15 and between the inside and the outside of the CPU 15.

The status detecting unit 15c detects the status of the units (such as the printer controller 12a, the printer engine 12c, a sheet conveying mechanism, and a drive mechanism) in the printer 12 based on the detection results acquired by known sensors and the like mounted on the units in the printer 12 and generates status information indicating whether the printer 12 is in a printable state. For example, the status information may be expressed by "1" that indicates a printable state and "0" that indicates an unprintable state. The generated status information is stored in the RAM 12e and the like.

The consumption status detecting unit 15d generates consumption state information by detecting the consumption status (such as remaining amount) of consumables such as toner based on detection results acquired by known sensors. The consumption state information, for example, may be information indicating whether the remaining amount of the consumables is in a normal state or in a low state. The consumption state information may be a numerical value indicating a ratio of the remaining amount to the full amount. The generated consumption state information may be stored in the RAM 12e and the like.

The time acquiring unit 15e acquires information indicating the current time. The current time may be acquired from an internal timer being set correctly, or may be acquired from an external time server through the network 5, the Internet network 10, and the like.

The time limit information obtaining unit 15f obtains information on a time limit for the printer to be restored to a printable state after an occurrence of a printing error that prevents the printer from print processing (time limit to the restoration of the printer to execute a print processing by itself) in advance. Upon receiving time limit data in which a time limit is recorded from an external device other than the printer 12 (itself) such as the print server 11 and the personal computer 13 (see FIG. 2), the information determining unit 15j determines whether the time limit data is data for the printer 12 or whether the time limit information table 19 is to be updated based on the time limit data. The time limit information read-write unit 15k updates time limit information of the time limit information table 19 and reads out time limit information from the time limit information table 19 to perform processing on the units based on the time limit data received from the external device and an input signal received by an input operation and the like performed on the operation panel 12b.

The print error detecting unit 15g detects a print error and identifies the type (mode) of the print error that has occurred such as out of paper and paper jam based on detection results acquired by known sensors and the like provided at each of the units in the printer 12. The timer 15h measures the elapsed time since the time measurement is started due to the occurrence of a print error.

The switching processing unit 15i performs a process (substitute print processing) of switching a job assignment to execute the print job (may also be referred to as "printing rights") to another printer 12. By comparing the time limit which is set with the elapsed time, the switching determining unit 15m determines to switch the job assignment to another printer 12 if the printer 12 is not restored to a printable state when the elapsed time reaches or exceeds the time limit. The switching request confirming unit 15n confirms the presence of a switching request. When the switching request is made, regardless of the relationship between the elapsed time and the set time, the job assignment to the printer 12 is switched to another printer 12. The switching request may be transmitted from the print server 11 when a print error occurs or may have been transmitted in advance. Information indicating the presence of switching request is stored in storage units (such as the RAM 12e, the NV-RAM 12g, and the magnetic disk device 12d) of the printers 12. The print suppression instructing unit 15o instructs another printer (lower-level printer) 12 to suppress printing. The print suppression cancellation instructing unit 15p instructs another printer (lower-level printer) 12 to cancel suppression of printing. In the present embodiment, the job assignment (printing rights) to execute the print job is switched by suppressing printing and canceling suppression of printing. The storage units (such as the RAM 12e, the NV-RAM 12g, and the magnetic disk device 12d) of the printers 12 store therein information indicating the job assignment (printing rights) such as information related to suppression of printing (for example, "1" indicates that printing is suppressed and "0" indicates that suppression of printing is cancelled).

When a print error occurs, the time limit setting unit 30 sets a time limit depending on the condition when the print error occurred. The page deletion processing unit 15q synchronizes print data (print job) stored in the printers 12. The contents of print data are stored in the page information table 18.

Basic Operation of Printing System

Figure 7:
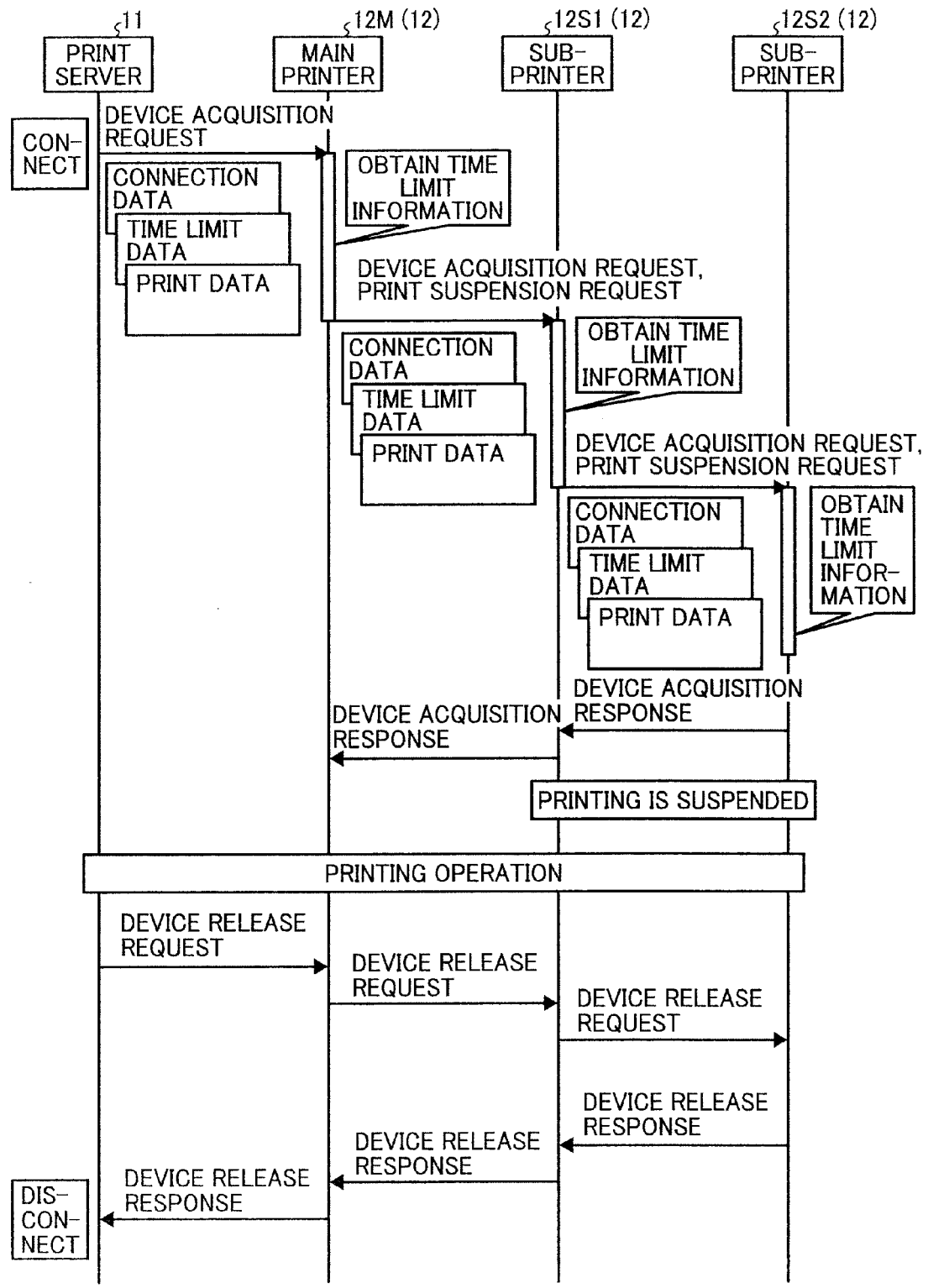
FIG. 7 is a sequence diagram of an example of a procedure for executing a print processing in the printing system.

FIG. 7 is an application example of the intranet 3 in which three printers of a main printer 12M, a sub-printer 12S1, and a sub-printer 12S2 are connected. The main printer 12M, the sub-printer 12S1, and the sub-printer 12S2 are set as a matter of practical convenience, and all the printers 12 may have the same structures. In the present embodiment, the printer 12 to which print data from the print server 11 serving as an upper host is first entered through the network is called the main printer 12M and the printers located below the main printer 12M are called the sub-printers 12S1 and 12S2.

The main printer 12M is uniquely determined by the print server 11 as a host apparatus. The sub-printer 12S1 and the sub-printer 12S2 may be fixedly determined, or the order of the sub-printer 12S1 and the sub-printer 12S2 may be changed in each process. The sub-printer 12S1 and the sub-printer 12S2 may be set (in other words, the order may be set) by storing an IP address of the printer 12, to which data is to be transmitted next, in the storage unit 16 (such as the RAM 12e, the NV-RAM 12g, and the magnetic disk device 12d) of the printer 12, and by referring to the stored IP address while transferring data.

As illustrated in FIG. 7, the print server 11 transmits a device acquisition request, connection data, and time limit data to the main printer 12M, together with the print data concerning the print job. The printers 12, upon receiving the device acquisition request, adds a print suppression request on the device acquisition request, the connection data, and the time limit data, and transmits the data to the printer 12 that is set as a transfer destination and is located below by one step. At this time, each of the printers 12 writes data required for performing the device acquisition process and job assignment (such as an IP address of the printer 12) on the connection data.

The sub-printer 12S2 set at the lowest level transmits a device acquisition response to the upper-level printer 12 (sub-printer 12S1). Upon receiving the device acquisition response from the printer 12 located below by one step, the sub-printer 12S1 transmits the device acquisition response to the printer 12 located above by one step. The job is not assigned to the printer 12 that has received the print suppression request. Accordingly, the job is assigned to the main printer 12M by the series of processes up to this point, thereby completing the device acquisition process.

Print processing is then performed. When there is no particular problem, the print processing is performed by the main printer 12M to which a job is assigned. However, when a print error occurs, the job may be assigned to another printer 12, and the print processing may be carried out by the other printer 12.

Upon finishing the print processing, a device release request is transmitted in the following order: the print server 11, the main printer 12M, the sub-printer 12S1, and the sub-printer 12S2. A device release response toward the device release request is transmitted in the following order: the sub-printer 12S2, the sub-printer 12S1, the main printer 12M, and the print server 11. The series of processes is completed when the print server 11 receives the device release response.

Operation Performed by Printer

Figure 8:
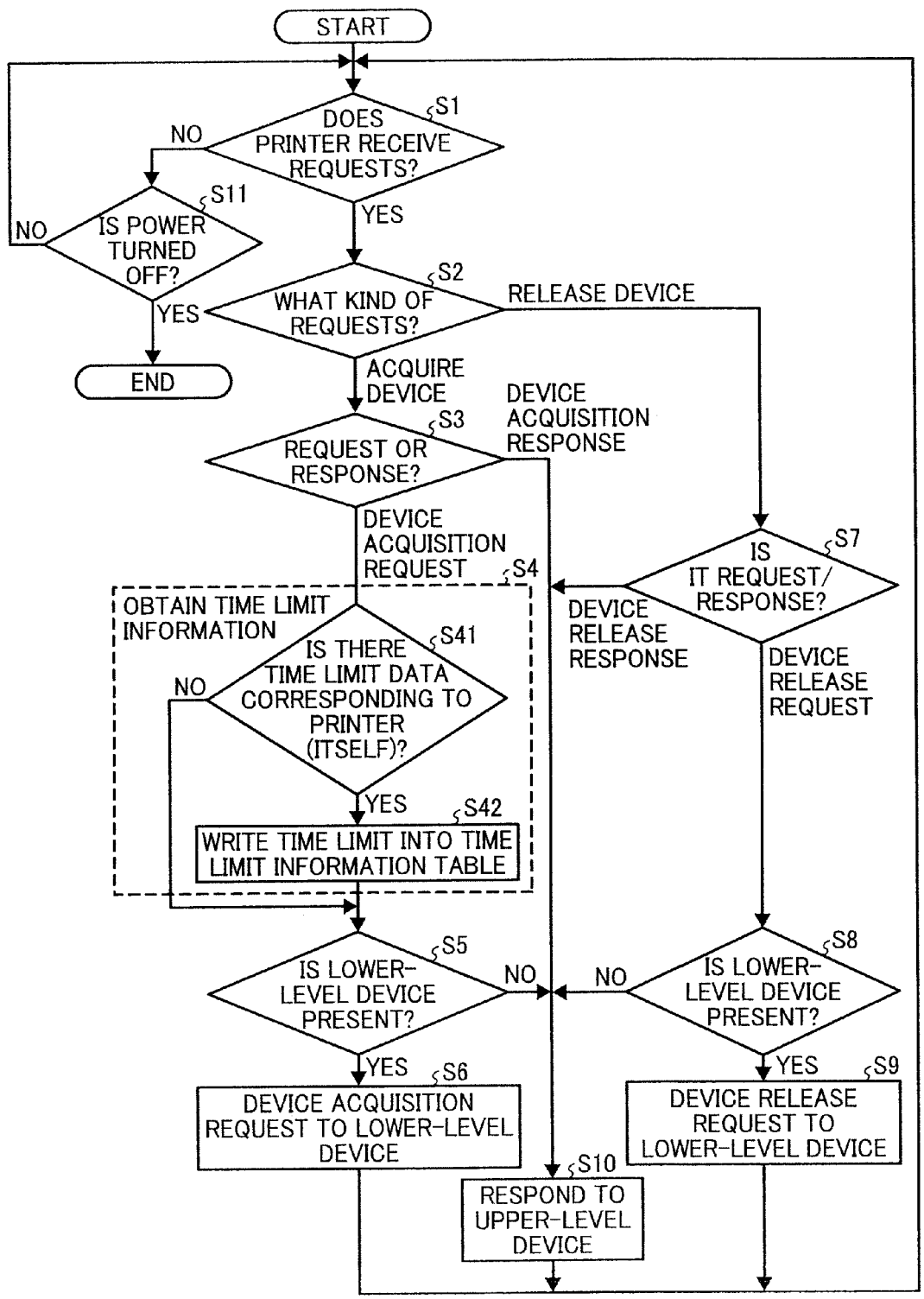
FIG. 8 is a flowchart of an example of a process procedure when a request or a response is received by the printing apparatus.

As illustrated in FIG. 8, each of the printers 12 receives a device acquisition request or a device release request (Step S1). If the request is the device acquisition request (right at Step S2 and down at Step S3), the CPU 15 acts as the time limit information obtaining unit 15f (see FIG. 6), and obtains time limit information (Step S4). In other words, at Step S4, the CPU 15 acts as the information determining unit 15j (see FIG. 6), and checks whether time limit data 20 received in response to the device acquisition request corresponds to the printer 12 (itself). More specifically, because property data 21 (see FIG. 9) is attached to the time limit data 20 (see FIG. 10), the information determining unit 15j searches information included in the property data 21 (Step S41).

As illustrated in FIG. 9, in the present embodiment, information (values) corresponding to items that indicate the printers 12 to which the corresponding time limit data 20 is to be applied (such as printer to be set, type, and consumable status), and items that specify an application method of the time limit data 20 (such as error classification method and time period) are specified in the property data 21. More specifically, as the printer to be set, for example, the IP address may be specified. A laser printer (LP) or a multi functional printer (MFP), for example, may be designated as the type of the printer 12. For the error classification method, for example, whether the time limit data 20 is applied to each error or to each of the error groups into which a plurality of errors is classified (see FIG. 10) may be designated. A period during which the time limit data 20 is applied ([period 1] 8:25 to 17:00 and [period 2] 17:00 to 8:25) as illustrated in FIG. 11 may be designated as the time period. In the example in FIG. 9, the time limit data 20 corresponding to the property data 21 is applied to the printer 12 to which the IP address specified in the property data 21 is given. The printer 12 has functions as a laser printer, and the consumable status is in a normal state in the printer 12. Moreover, for the printer 12 to which the time limit data 20 is applied, the setting of the time limit based on the time limit data 20 is specified to be performed for each error and the time limit based on the time limit data 20 is designated to be valid during the period 1.

The property data 21 and the time limit data 20 may be generated by the print server 11 or may be generated by, for example, other equipment (such as the personal computer 13, see FIG. 2). The time limit data 20 may be produced based on an input operation performed on the operation panel 12b of the printer 12, or the time limit information stored in the time limit information table 19 may be rewritten based on an input operation performed on the operation panel 12b. The time limit data 20 need not necessarily be transmitted to the printer 12 together with the print data, the device acquisition request, or the like. The time limit data 20 may be transmitted separately.

As described above, the time limit information obtaining unit 15f narrows down the time limit corresponding to a printer (itself), by obtaining information indicating the time limit from the time limit data 20 based on the property data 21. Accordingly, in the present embodiment, the time limit information obtaining unit 15f also functions as the time limit setting unit 30.

Among a plurality of print errors (from Error 1 to Error 15 in the example in FIG. 10), errors that take similar time for normal restoration may be classified into the same error group. By setting the error groups in this manner, it is possible to reduce the capacity of the time limit data 20 and the time limit information table 19.

As illustrated in FIG. 10, in the present embodiment, in the process for switching the job assignment, a time limit for the printer to restore to a printable state after an error occurred is set for each print error or for each error group. In this manner, it is possible to reduce unnecessary waiting time for switching the print processing, thereby completing the print processing more rapidly.

Referring back to FIG. 8, at Step S41, when the printer (itself) is proven to be an object to which the time limit data 20 corresponding to the property data 21 is applied (Yes at Step S41) as a result of searching the property data 21, the CPU 15 acts as the time limit information read-write unit 15k (see FIG. 6), and writes the time limit information provided in the time limit data 20 into the time limit information table (storage area) 19 (Step S42). At Step S42, the time limit information corresponding to the printer is written in the time limit information table 19 for each error and each error group in an associated manner.

After setting a time limit at Step S4, when a lower-level device (the print server 11 or the printer 12) is existed (Yes at Step S5), the printer 12 transfers the device acquisition request to the lower-level device (Step S6). Upon receiving a device release request (down side at Step S7) and when a lower-level device is existed (Yes at Step S8), the printer 12 transfers the device release request to the lower-level device (Step S9).

Upon receiving a device acquisition response and a device release response (right side at Step S3 and left side at Step S7), and when a lower-level device is not present at Step S5 and Step S8, the printer 12 responds to an upper-level printer 12 (Step S10). When the power is turned off, all the processes are finished (Step S11).

Substitute Print Processing

Figure 12:
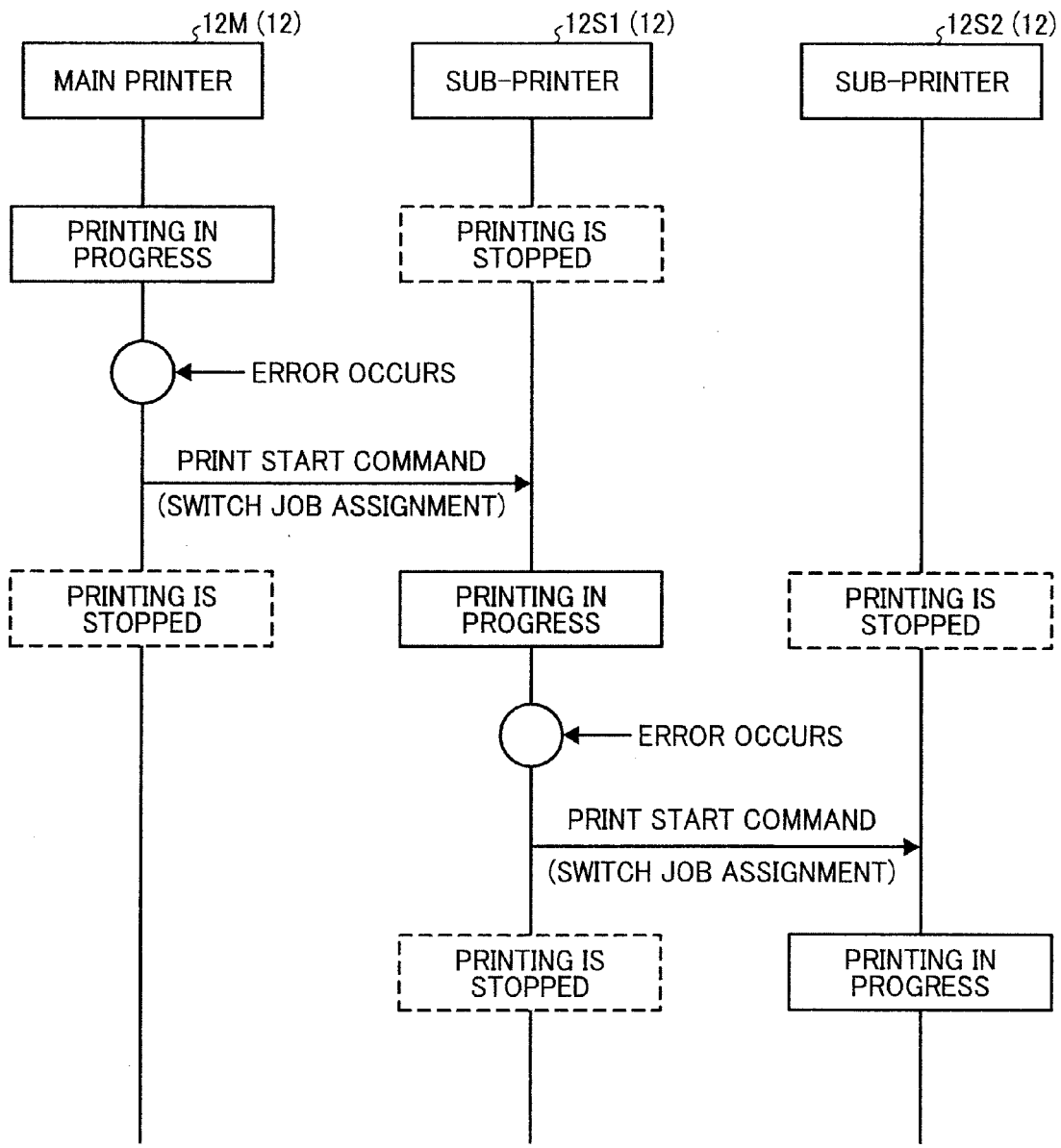
FIG. 12 is a sequence diagram of an example of a procedure for switching a job assignment in the printing system.

As illustrated in the sequence diagram in FIG. 12, while the main printer 12M to which the job is assigned is performing a print processing, the other printers 12 (sub-printer 12S1 and sub-printer 12S2) are in a printing stop state. In the present embodiment, even if a print error occurs while the main printer 12M is performing the print processing, the job assignment to the main printer 12M is not immediately switched to another printer 12, and if the main printer 12M is restored to a printable state within the time limit, the print processing is performed by the main printer 12M. If the elapsed time since the print error occurred reached or exceeded the time limit being set, the job assignment is switched. The similar process is performed when the job is assigned to the sub-printer 12S1 or 12S2.

Figure 13:
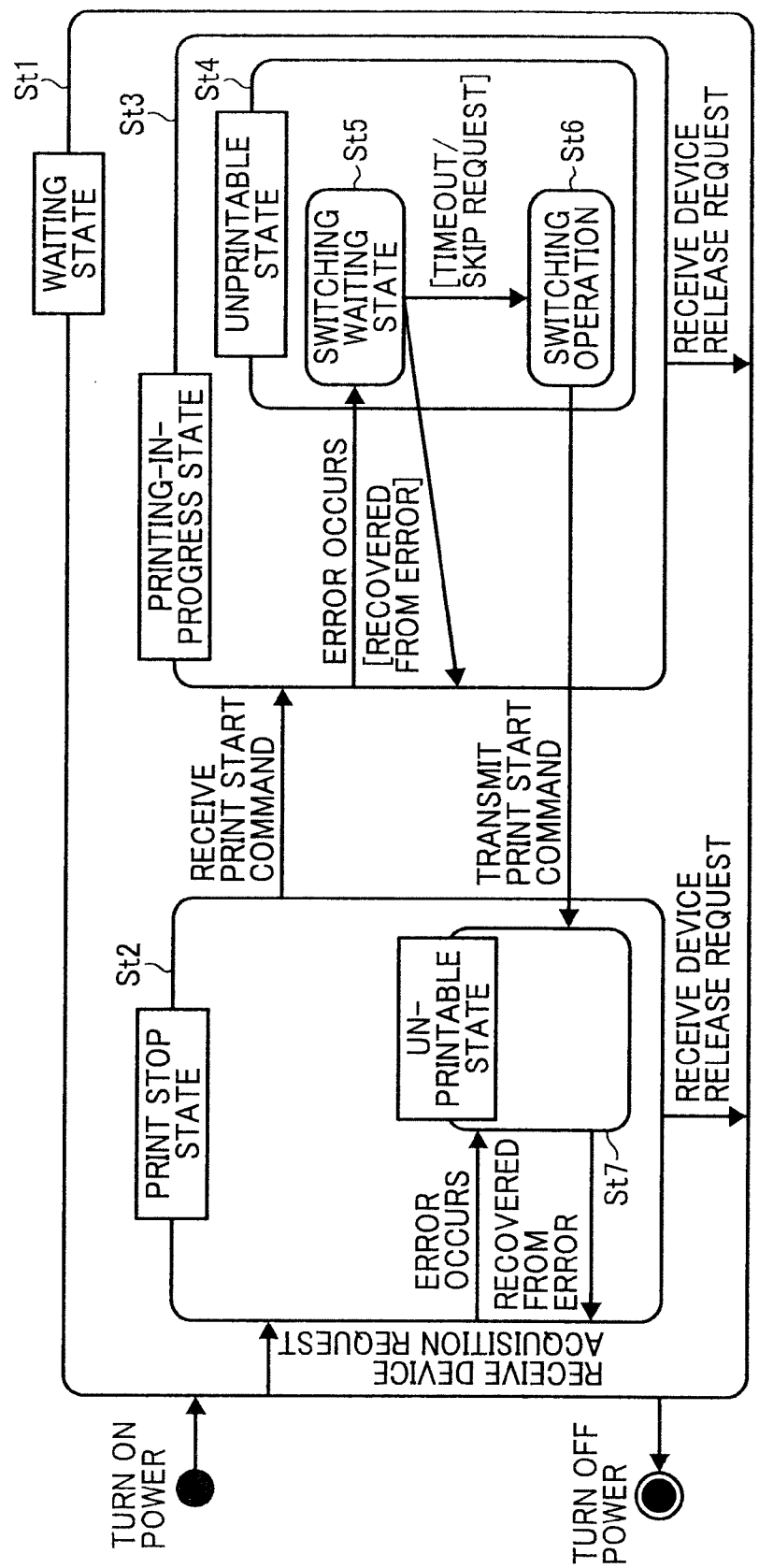
FIG. 13 is a schematic of an example of a state transition of the printing apparatus.

As illustrated in a state transition diagram in FIG. 13, when the power is turned on, the printer 12 enters a waiting state St1. Upon receiving a device acquisition request at the waiting state St1, the printer 12 enters a print stop state St2. Upon receiving a print start command (information for defining a job assignment such as a print suppression cancellation request) at the print stop state St2, the printer 12 enters a printing-in-progress state St3. When a print error occurs at the printing-in-progress state St3, the printer 12 first enters a switching waiting state St5 in an unprintable state St4. When the print error is corrected within the time limit being set, the printer 12 may return to the printing-in-progress state St3. However, if the time limit is exceeded or a mandatory skip request (switching request) is received, the printer 12 enters a switching operation executing state St6 at which the switching operation is executed. After a print start command is transmitted to another printer 12, the printer 12 enters the print stop state St2 and also enters an unprintable state St7.

Figure 14:
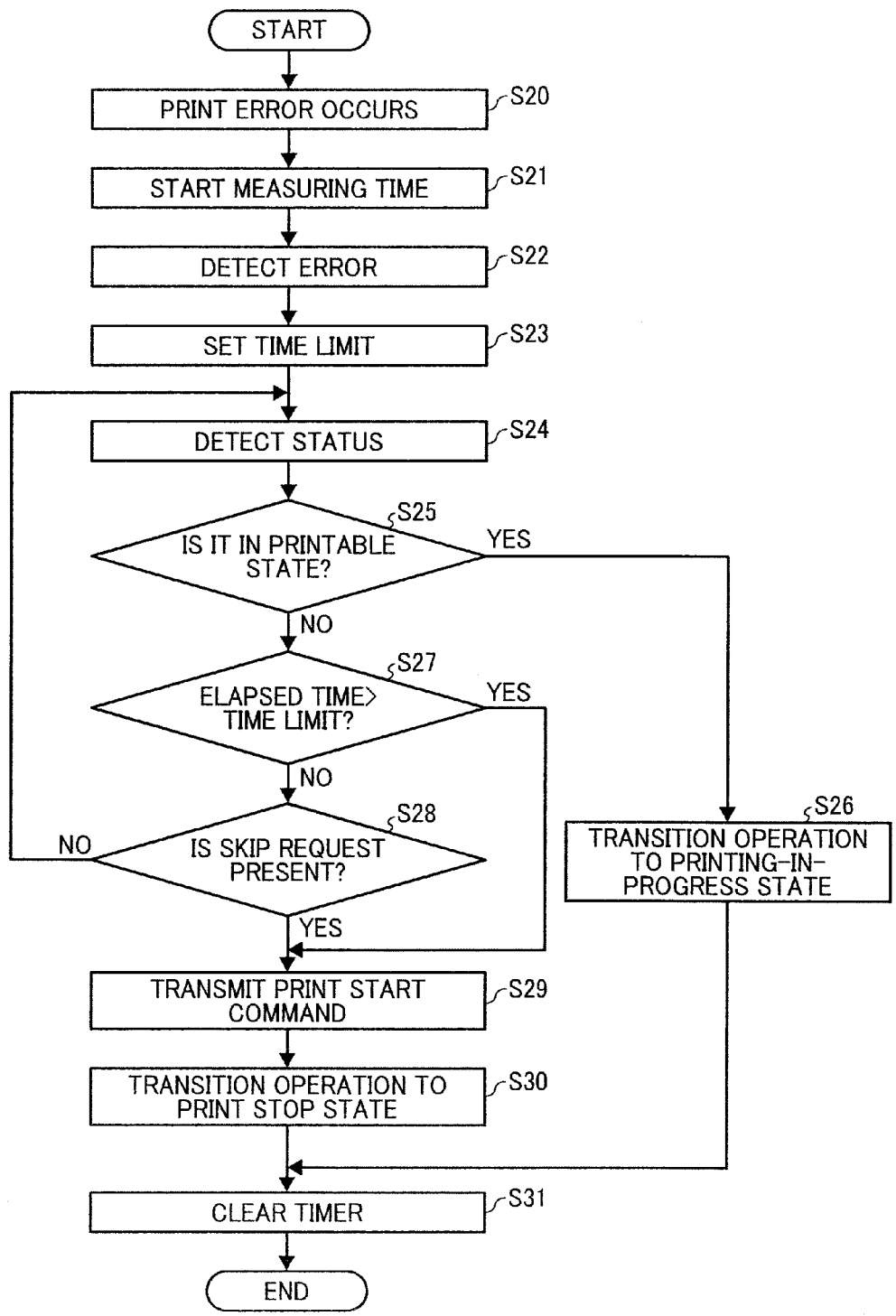
FIG. 14 is a flowchart of an example of a process procedure when a print error occurs in the printing apparatus.

As illustrated in a flowchart in FIG. 14, when a print error occurs in the printer 12 to which a job is assigned (Step S20), the CPU 15 of the printer 12 acts as the timer 15h (see FIG. 6), and starts measuring time by using an internal timer and the like (Step S21). The CPU 15 then acts as the print error detecting unit 15g and identifies the error that has occurred (Step S22). The CPU 15 then acts as the time limit setting unit 30, refers to the time limit information table 19, and sets a time limit based on the identified error (Step S23). At Step S23, if information indicating the time limit for each consumption status and each time period is stored in the time limit information table 19, the CPU 15 serving as the time limit setting unit 30 sets a time limit based on the consumption status and the time at that point. In this case, the CPU 15 also acts as the consumption status detecting unit 15d and the time acquiring unit 15e (see FIG. 6). If the property data 21 specifies to set a time limit for each error group, the time limit setting unit 30 sets a time limit corresponding to the error group to which the error belongs. Information indicating the time limit used in the switching operation in FIG. 14 is written into a predetermined storage area of a storage unit such as the RAM 12e.

The CPU 15 then acts as the status detecting unit 15c and detects whether the printer 12 is in a printable state by referring to the detection results and the like of the sensors of the units in the printer 12 (Step S24). If the status detection at Step S24 indicates that the printer 12 is in a printable state (Yes at Step S25), the CPU 15 performs a transition operation (Step S26) from the unprintable state St4 to the printing-in-progress state St3 (see FIG. 13) (Step S26), so as to prepare for reprinting a page that was not able to be printed and the like. The CPU 15 then finishes measuring time by the timer 15h (Step S31) and finishes the switching operation. In other words, in this case, the printer 12 is restored to a printable state before the elapsed time reaches the time limit being set or before exceeding the time limit. Accordingly, there is no need to switch the job assignment.

If the status detection at Step S24 indicates that the printer 12 is in an unprintable state (No at Step S25), the CPU 15 starts acting as the switching processing unit 15i. In other words, the CPU 15 acts as the switching determining unit 15m at first, and compares the elapsed time since the print error occurred measured by the timer 15h (elapsed time since the timer 15h started measuring) with the time limit being set (Step S27). If the elapsed time does not exceed the time limit being set, the CPU 15 acts as the switching request confirming unit 15n, and confirms the presence of a skip request (switching request) (Step S28). If the presence of the skip request is not confirmed at Step S28, the CPU 15 returns to Step S24, and detects the status again. In other words, in the present embodiment, if the skip request is not present, the detection of the status at Step S24 is continued until the elapsed time reaches or exceeds the time limit.

If the result of the comparison at Step S27 indicates that the elapsed time has reached or exceeded the time limit being set and if the skip request is present at Step S28 (Yes at Step S27 or Step S28), the CPU 15 performs a process of moving the job assignment from the printer 12 (itself) to the lower-level printer 12 (Step S29). In other words, at Step S29, the CPU 15 acts as the print suppression cancellation instructing unit 15p, and transmits a print suppression cancellation request to the lower-level printer 12 as a print start command. The CPU 15 then performs a process of causing the printer 12 (itself) to enter the print stop state St2 and the unprintable state St7 (Step S30). At Step S30, the CPU 15 causes the printer 12 (itself) to enter the same state as when the print suppression request is received and erases data and the like temporarily stored in the storage unit to carry out the print processing. The CPU 15 also displays information indicating that an error has occurred on the operation panel 12b, and notifies the print server 11 of data indicating the information. Upon finishing Step S30, the CPU 15 finishes measuring time by the timer 15h (Step S31), and finishes the switching operation.

As described above, the printer 12 of the printing system 1 according to the present embodiment includes the time limit setting unit 30 that variably sets a time limit for the printer 12 to be restored to a printable state after an occurrence of a print error that prevents the printer 12 from printing. The printer 12 also includes the switching processing unit 15i that switches the job assignment from the printer 12 to another printer 12 if the printer 12 is not in a printable state when the elapsed time since a print error occurred in the printer 12 reaches the time limit being set or exceeds the time limit. Accordingly, depending on the condition, the time at which the execution of printing is switched from the original printer 12 to another printer 12 may be changed. Consequently, depending on the situation, printing may be performed by the original printer 12 that is restored from the print error, thus printing may be carried out more efficiently.

In the present embodiment, the time limit setting unit 30 sets a time limit for each print error that has occurred. Depending on the print error, the printer may be easily restored to a printable state or may be difficult to be restored to a printable state. Time required for restoration differs depending on the print error. Accordingly, by variably setting the time limit for each print error, it is possible to more efficiently perform the print processing. As an example, the time limit for the print error that takes time for restoration or is difficult to restore, such as paper jam, may be set to "0". In this case, the job assignment is immediately changed to another printer 12, thereby promptly completing the print processing. The time limit for the print error from which the printer can be restored relatively easily such as out-of-paper (when paper runs out), may be set by taking, a time required for restoration and a traveling time of a user to another printer 12, into account (extra efforts required when a job is switched). If the printer 12 is restored to a printable state within the time limit, the printing is performed by the original printer 12. This is convenient when the printer 12 is located near the user.

In the present embodiment, the time limit setting unit 30 sets a time limit for each error group to which the print error that occurred belongs. Accordingly, handling of time limit becomes easier (such as initial setting of a time limit in the print server 11, the personal computer 13, and the printer 12). It is also possible to further reduce the capacity of the time limit information table 19 and the time limit data 20.

In the present embodiment, the time limit setting unit 30 sets a time limit based on a consumption status of the consumables in the printer 12. For example, when only a little amount of the consumables remain, even if the print processing is performed by the restored printer 12 to which a job is assigned originally, a good printing quality may not be obtained and extra efforts may be required. In such an event, it is more convenient to switch the job assignment to another printer 12 by setting the time limit shorter than usual. In this manner, by changing the time limit based on the consumption status of the consumables, printing may be carried out more efficiently.

In the present embodiment, the time limit setting unit 30 sets a time limit based on a time of a day in which the print error occurred. For example, if the user is not present near the printer such as at night, restoration by the user may not be expected. Accordingly, the time limit is set to "0". In this manner, by changing the time limit based on the time of a day, printing may be carried out more efficiently.

In the present embodiment, the time limit setting unit 30 sets a time limit for each of the printers 12. Because the structure of each of the printers 12 differs, the time required for restoration by the user may be different depending on the printer 12. Accordingly, in such an event, the time limit is changed for each printer 12 and printing may be carried out more efficiently.

In the present embodiment, the time limit setting unit 30 sets a time limit in accordance with the type of printer 12. Because the structure of the printer 12 differs by type, the time required of the user for restoration may be different depending on the type of the printer 12. In such an event, the time limit is changed depending on the type of the printer 12 and printing may be carried out more efficiently.

In the present embodiment, when a switching request for switching a job assignment to another printer 12 is received, the switching processing unit 15i switches the job assignment to another printer 12, regardless of the elapsed time since a print error occurred. Accordingly, a print processing desired by the user may be carried out more easily.

In the present embodiment, the time limit setting unit 30 sets a time limit based on the time limit data externally received by the printer 12. Accordingly, the time limit may be changed remotely, and the setting for changing the time limit may be carried out more efficiently by using equipment which is easier to be input.

In the present embodiment, the time limit setting unit 30 sets a time limit corresponding to the input to the printer 12. Accordingly, a print processing desired by the user who receives the printed matter may be carried out more easily.

Exemplary embodiments of the present embodiment have been described. However, the present invention is not limited to the embodiments, and various modifications are possible. For example, in the embodiment, the time limit is selected at two stages by the time limit information obtaining unit 15f that narrows down the time limit in advance and by the time limit setting unit 30 that sets the final time limit when a print error occurs. However, it is not limited thereto, and the time limit may be set only when the print error occurs. The job assignment switching operation (substitute print processing) is also not limited to the embodiment.

In the present invention, the time at which the execution of print processing is changed from the original printing apparatus to another printing apparatus may be changed depending on the condition. Accordingly, depending on the situation, printing may be carried out by the original printing apparatus recovered from the print error. Consequently, it is possible to execute printing more efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing apparatus for connection to a host apparatus and at least one of other printing apparatuses, the printing apparatus comprising:
    a storage unit that stores therein one or more types of print errors that prevent the printing apparatus from printing and time limits for respective types of print errors, each time limit indicating a time from an occurrence of a corresponding type of print error to transmission of a print job corresponding to the printing prevented due to the corresponding type of print error to one of the other printing apparatuses;
    a detecting unit that detects an occurrence of one of the types of print errors stored in the storage unit while the printing apparatus executes printing corresponding to a print job transmitted from the host apparatus;
    a determining unit that determines whether the printing apparatus is in a printable state until an elapsed time since the detecting unit detected the occurrence of the one of the types of print errors reaches a time limit stored in the storage unit associated with the one of the types of print errors; and
    a control unit that causes one of the other printing apparatuses to execute the print job when the determining unit determines that the printing apparatus is not in a printable state.

2. The printing apparatus according to claim 1, wherein error groups are defined by classifying the types of print errors, and
    the time limits are set for the respective error groups in the storage unit.

3. The printing apparatus according to claim 1, wherein the time limits are set based on a consumption status of a consumable in the printing apparatus.

4. The printing apparatus according to claim 1, wherein the time limits are set based on a time period during which the print error occurred.

5. The printing apparatus according to claim 1, wherein the time limits are set for each of the other printing apparatuses.

6. The printing apparatus according to claim 1, wherein the time limits are set based on types of the other printing apparatuses.

7. The printing apparatus according to claim 1, wherein the control unit switches the print job to the one of the other printing apparatuses regardless of the elapsed time since the detected type of print error occurred when a switching request for switching the print job to another printing apparatus is present.

8. The printing apparatus according to claim 1, wherein the time limits are set based on time limit data externally received by the printing apparatus.

9. The printing apparatus according to claim 1, wherein the time limits are set based on an input to the printing apparatus.

* * * * *